United States Patent [19]

Hashimoto

[11] Patent Number: 5,720,011
[45] Date of Patent: Feb. 17, 1998

[54] IMAGE FORMING APPARATUS WHICH OUTPUTS A TEST PATTERN TO DETERMINE A SOURCE OF FAILURE

[75] Inventor: Tomohiro Hashimoto, Kawasaki, Japan

[73] Assignee: Canon Kabushiki Kaisha, Tokyo, Japan

[21] Appl. No.: 412,316

[22] Filed: Mar. 29, 1995

[30] Foreign Application Priority Data

Mar. 29, 1994 [JP] Japan ................................. 6-058635

[51] Int. Cl.$^6$ ................................................. G06K 15/00
[52] U.S. Cl. ........................... 395/109; 395/112; 395/113; 358/504
[58] Field of Search ............................ 395/109, 113, 395/112, 101; 358/504, 518, 527, 406, 455, 458; 355/203, 205, 206, 308

[56] References Cited

U.S. PATENT DOCUMENTS

| | | |
|---|---|---|
| 4,710,785 | 12/1987 | Mills ................................. 346/153.1 |
| 5,065,234 | 11/1991 | Hung et al. ........................ 358/518 |
| 5,345,315 | 9/1994 | Shalit ................................ 358/527 |
| 5,485,283 | 1/1996 | Kaneko ............................. 358/527 |
| 5,522,017 | 5/1996 | Ueda ................................. 395/109 |

FOREIGN PATENT DOCUMENTS 62-29355  7/1985  Japan ............................. H04N 1/00

*Primary Examiner*—Dwayne Bost
*Assistant Examiner*—Tracy M. Legree
*Attorney, Agent, or Firm*—Fitzpatrick, Cella, Harper & Scinto

[57] ABSTRACT

Binary and multi-value test patterns respectively generated by a test pattern generation circuit and a multi-value pattern generation circuit, which are independent from each other, are printed, and the presence/absence of an abnormality of an image forming apparatus, and the source of the abnormality, i.e., the engine side or the controller side, are categorized on the basis of the print states of the patterns.

9 Claims, 11 Drawing Sheets

FIG. 8

| | BINARY PATTERN | MULTI-VALUE PATTERN | CAUSE OF ABNORMALITY |
|---|---|---|---|
| a | NORMAL | NORMAL | CONTROLLER |
| b | NORMAL | ABNORMAL | ENGINE BINARY UNIT |
| c | ABNORMAL | NORMAL | ENGINE MULTI-VALUE UNIT |
| d | ABNORMAL | ABNORMAL | ENGINE BINARY UNIT > MULTI-VALUE UNIT |

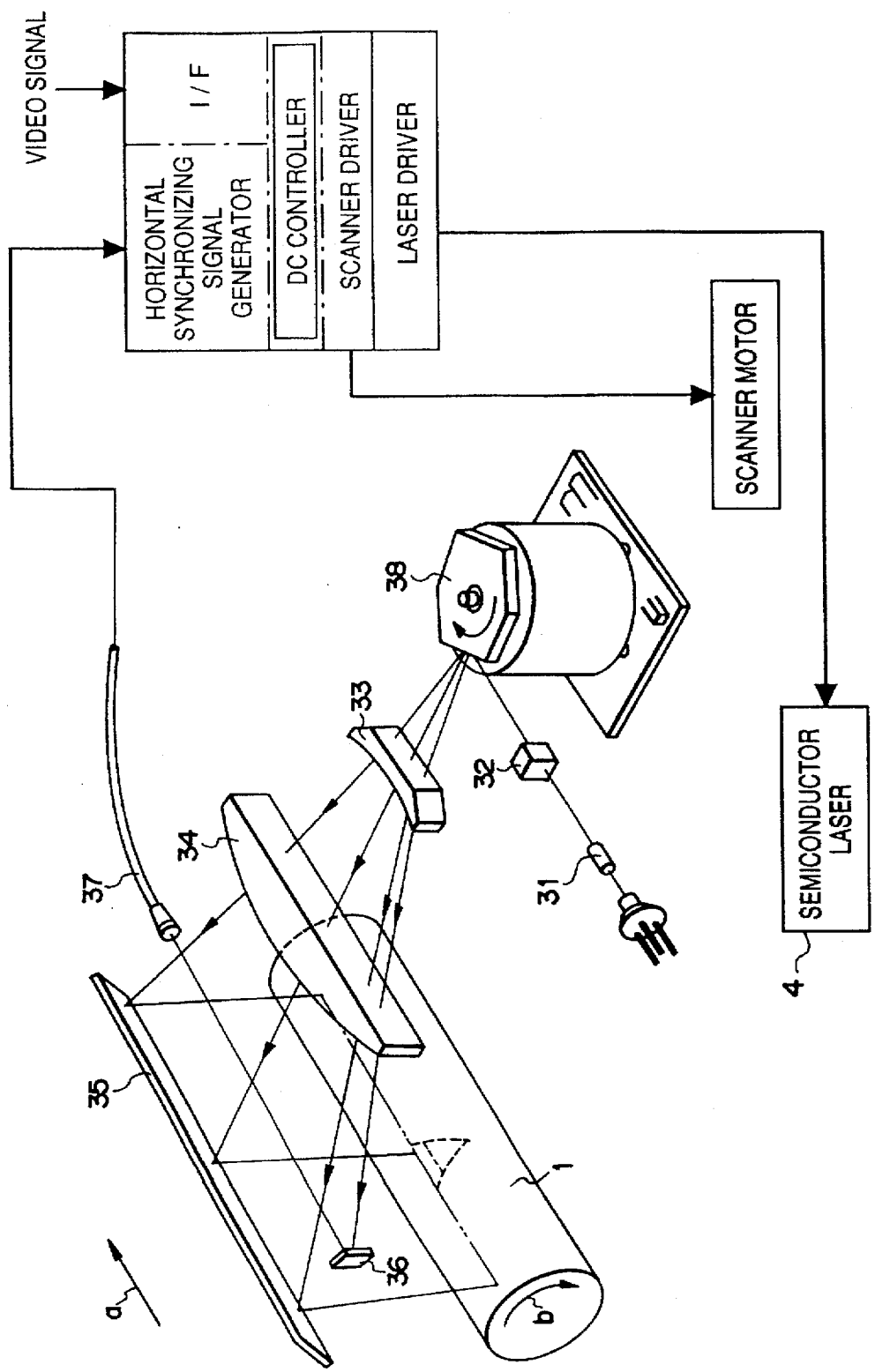

1

IMAGE FORMING APPARATUS WHICH OUTPUTS A TEST PATTERN TO DETERMINE A SOURCE OF FAILURE

BACKGROUND OF THE INVENTION

The present invention relates to an image forming apparatus and, more particularly, to an image forming apparatus for outputting a test pattern.

Conventionally, many kinds of image forming apparatuses such as a photo-electric printer consist of a controller for generating video signals and an engine for forming an image based on video signals generated by the controller. The engine does not generally form an image if video signals are not inputted, however, it is capable of forming images by itself, which is called a test printing. This construction makes it easy to determine which of these, the controller or the engine, is faulty when an appropriate printing is not performed by the image forming apparatus.

More particularly, the engine has an internal test pattern generating circuit for printing out predetermined test patterns even when the video signals are not inputted from the controller. Therefore, it is possible to determine whether the engine is defective by checking whether or not the printing is properly done.

The engine test pattern generated in the abovementioned engine is used for categorizing the cause of a failure between the printer engine side and the controller side upon occurrence of a print abnormality, and for skew examination of paper sheets due to mechanical and mechanism factors.

Recently, it is required for the image forming apparatus to produce a color image and a high-quality image. For that purpose, video signals composed of a plurality of bits representing a half-tone image are inputted to the engine and image processing such as γ-conversion and binarization is performed on the video signals.

In this kind of image forming apparatus with a higher performance, it is often difficult to determine which of these, the controller, the engine, an image processing circuit in the controller or other portions of the apparatus, is faulty, even if the test pattern is printed out to check the condition of the image forming apparatus.

SUMMARY OF THE INVENTION

The present invention is made in consideration of the above problems, and has as its object to provide an image forming apparatus which easily recognizes which of these, the printer engine or the controller, causes a print abnormality.

It is another object of the present invention to provide an image forming apparatus which easily designates a portion that causes a failure of a printer engine.

In order to achieve the above objects, according to the invention, there is provided an image forming apparatus which includes multi-value image forming means for performing image formation by performing predetermined conversion of externally input multi-value image data, including: input means for externally inputting multi-value image data, conversion means for performing predetermined conversion on multi-value image data, first pattern generation means for generating multi-value image data representing a multi-value test pattern, selection means for selectively providing the multi-value image data input by the input means or the multi-value image data generated by the first pattern generation means to the conversion means, second pattern generation means for generating binary image data representing a binary test pattern, and output means for outputting a visual image based on image data converted by the conversion means and, or on the binary image data.

Other features and advantages of the present invention are apparent from the following description taken in conjunction with the accompanying drawings, in which like reference characters designate the same or similar parts throughout the figures thereof.

BRIEF DESCRIPTION OF THE DRAWINGS

FIG. 8 is a view showing the categorization of a failed portion on the basis of an engine test pattern;

FIG. 12 is a diagram for describing one example of an image exposing means equipped in the optical unit 107 shown in FIG. 11.

DETAILED DESCRIPTION OF THE PREFERRED EMBODIMENTS

The preferred embodiments of the present invention are described in detail hereinafter with reference to the accompanying drawings.

First Embodiment

Figure 11:
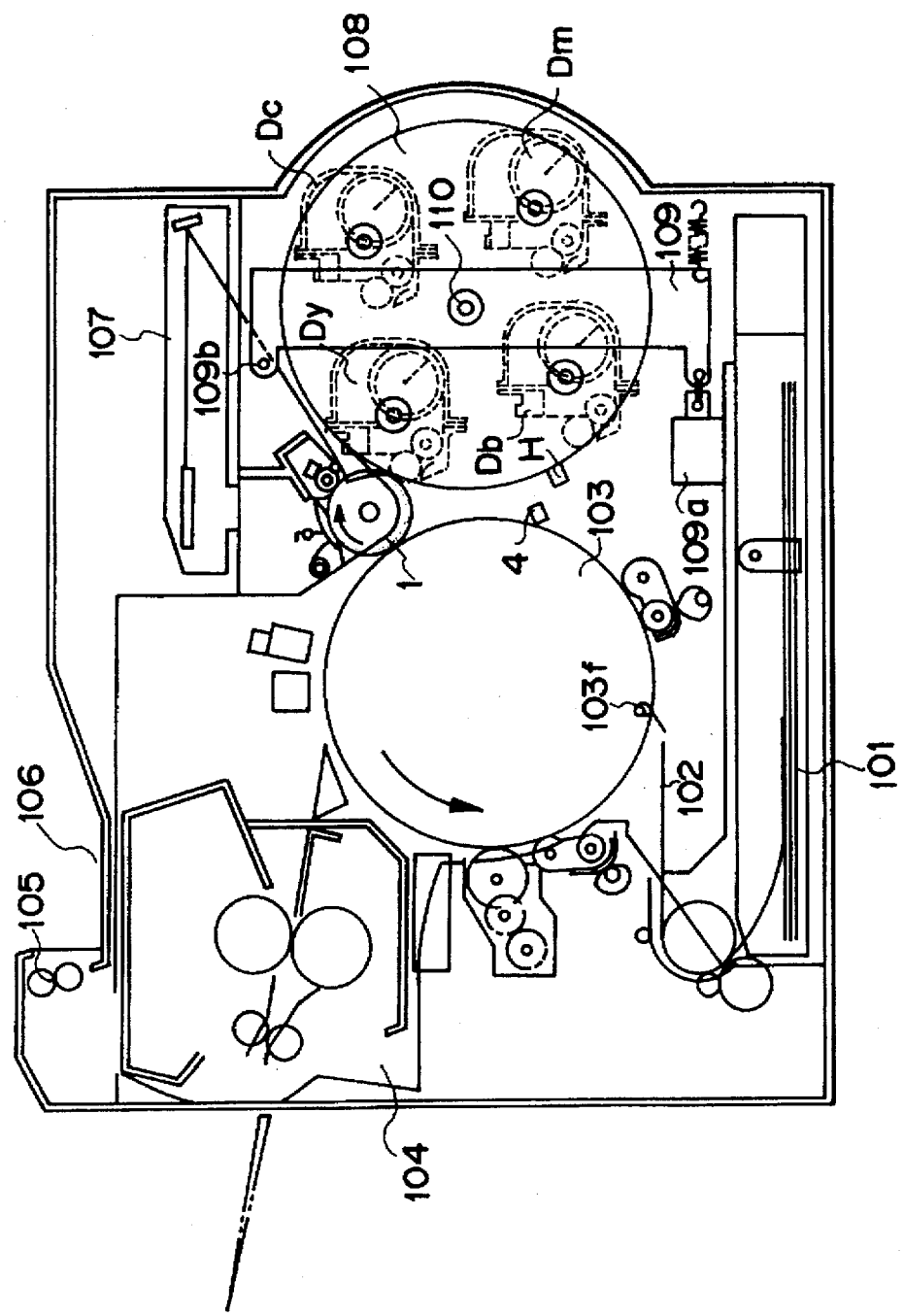
FIG. 11 is a diagram showing the construction of whole of a single-drum multi-transfer color laser-beam printer.

FIG. 11 is a diagram showing the construction of a single-drum multi-transfer color laser-beam printer. As shown in FIG. 11, paper 102 fed from a paper feeder 101 is retained on the outer circumference of a transfer drum 103 while its leading edge is held by a gripper 103f.

Latent images for respective colors formed on a photosensitive drum 1 by an optical unit 107 are developed by respective color developing devices Dy, Dc, Dm, Db and are transferred a plurality of times to the paper situated on the outer circumference of the transfer drum 103, thereby forming a multi-colored image. The paper is then separated from the transfer drum 103, fixed by a fixing unit 104 and ejected into a paper-discharge tray 106 from a paper ejecting unit 105.

Each color developing device has a rotational support shaft 110 on both sides and is held by a developing-device selecting mechanism 108 in such a manner that each color developing device is capable of rotating about its support shaft. Thus, each color developing device is revolved for selection purposes in such a manner that the attitude thereof is held constant at all times, as shown in FIG. 11.

After the selected developing device is moved to a developing position, the selecting mechanism 108 employs a solenoid 109a to move a selecting-mechanism support frame 109 together with the developing devices in the direction of the photosensitive drum 1 about a pivot point 109b. The rotational support shaft 110 is fixed to the main body of the printer.

A detector 4 detects a home position of the developing-device selecting mechanism 108 in such a manner that the detector detects a boss with a reference H in FIG. 11, which is projected from the outer circumference of the selecting mechanism 108. Accordingly, a printer controller (not shown) confirms a position of each color developing device on the basis of the boss and determines a rotation angle of the developing-device selecting mechanism 108 to select a desired developing device.

For an image exposure in the above-mentioned printer, an image exposure obtained from, say, a laser-beam scanner is utilized.

FIG. 12 is a diagram for describing one example of an image exposing means utilized in the optical unit 107 shown in FIG. 11. In FIG. 12, a semiconductor laser 41 is optically modulated in accordance with a color-resolved image of an image signal. A laser beam emitted by the semiconductor laser 41 is directed to a polygon mirror 38 via a collimator lens 31 and a cylindrical lens 32 and deflected by a polygon mirror 38. Then the laser beam is imaged by an f-θ lens which consists of a convex lens 33 and a toric lens 34, reflected in its optical path by a reflection mirror 35 and introduced to the photosensitive drum 1. Accordingly, the laser beam is scanned on the surface of the photosensitive drum 1 in a prescribed direction of the arrow a at a constant speed, thus fixing an image on the drum 1 in response to the color-resolved image.

A part of the laser beam reflected by a horizontal synchronizing mirror 36 is introduced to an optical fiber 37 for detecting an index signal which indicates an initial direction a scanning line of the beam. This index signal is used as a standard for determining a write-in timing of a line an image.

Figure 1:
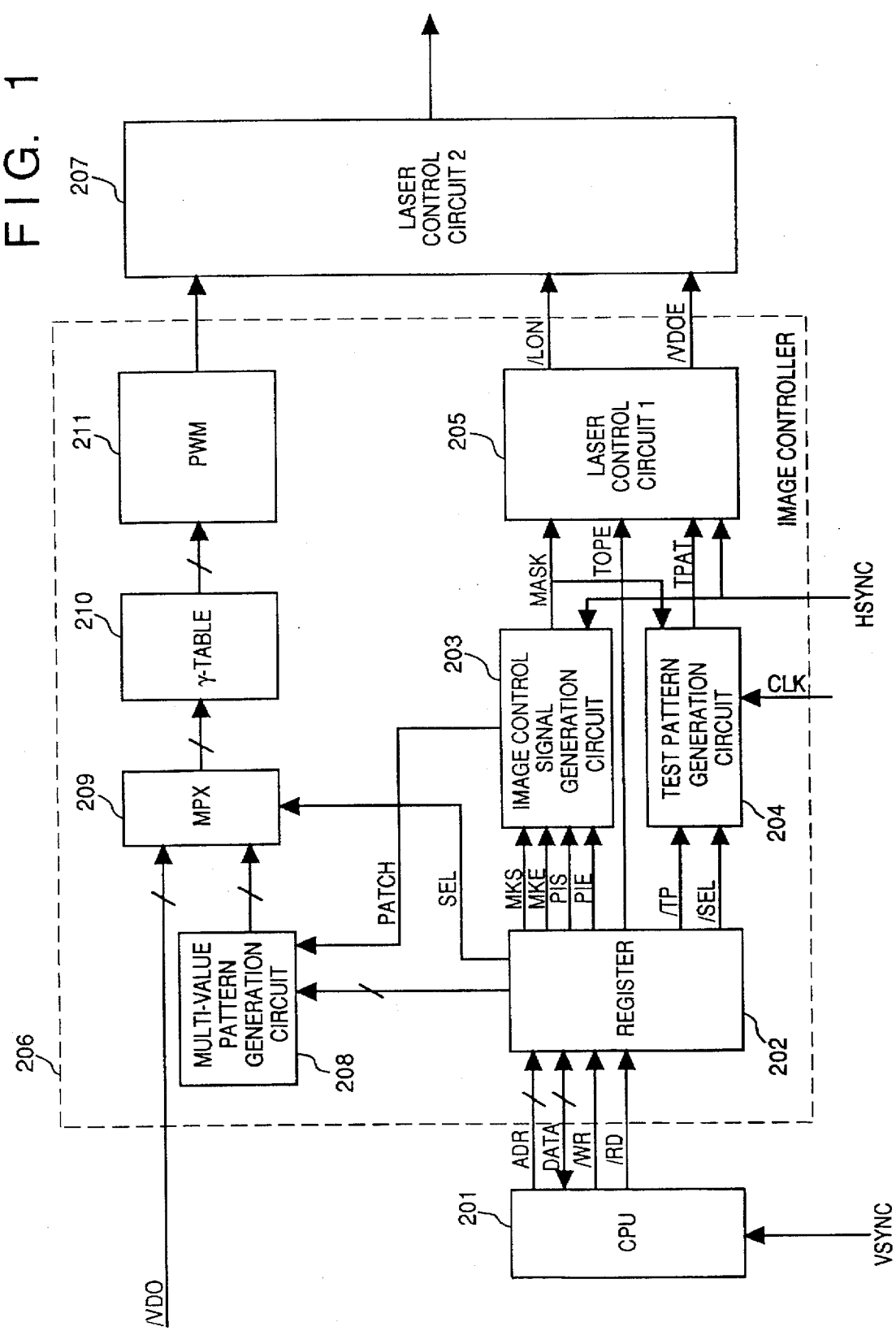
FIG. 1 is a block diagram showing the arrangement of an image forming apparatus according to the first embodiment of the present invention.

FIG. 1 is a block diagram showing the arrangement related to generation of a laser-drive signal in an image forming apparatus according to the first embodiment of the present invention. Referring to FIG. 1, reference numeral 201 denotes a CPU for controlling the processing sequence entire of the engine in the image forming apparatus. The CPU 201 supplies register values required for causing an image control signal generation circuit 203 in an image controller 206 to generate an image control signal, information indicating a test print mode and associated with the type of test pattern to be generated, and a sub-scanning mask signal TOPE to a register 202.

The CPU201 writes in an "ON data" to a register, which corresponds to the TOPE signal, in response to a VSYNC signal which is outputted when the above-mentioned transfer drum 103 has reached a predetermined rotating position. Later, the CPU 201 writes in an "OFF data" after a time collapses corresponding to a paper size in a sub-scanning direction and makes the TOPE signal inactive.

Reference numeral 203 denotes an image control signal generation circuit which generates a control signal MASK corresponding to a main scanning direction of the image size and a multi-value pattern output enable signal PATCH on the basis of the values supplied from the register 202: The image control signal generation circuit has a counter which is reset by a horizontal synchronizing signal HSYNC, turns on a MASK (PATCH) signal when the counter reaches a count equal to an MSK (PTS) value and turns off the MASK (PATCH) signal when the counter reaches a count equal to an MKE(PTE) value. Reference numeral 204 denotes a test pattern generation circuit for generating a test pattern TPAT in the test pattern mode.

Reference numeral 205 denotes a laser control circuit 1, which generates a /VDOE signal (symbol "/" indicates that the logic of the corresponding signal is active low) indicating a print enable region and a /LON signal, on the basis of the main scanning control signal MASK and the sub-scanning control signal TOPE. Upon input of the HSYNC signal, the laser control circuit 1 (205) generates an unblanking signal (not shown) to turn a laser on in a non-print region for generating the next HSYNC signal. The above-mentioned /VDOE signal becomes active while both the MASK signal and the TOPE signal are ON, and while the unblanking signal is being outputted. The /LON signal, in a normal image forming operation, becomes active while the unblanking signal is being outputted.

It should be noted that when a BD (beam detection) error occurs, the /LON signal is forcibly activated so as to determine whether a portion related to a laser control or a portion related to a scan control is at fault. After determination of the fault, the /LON becomes inactive. When other kinds of errors are detected, the /LON immediately becomes inactive. In the test pattern mode, a test pattern signal generated by the test pattern signal generation circuit 204 and the /LON signal are turned on.

Reference numeral 208 denotes a multi-value pattern generation circuit, which supplies multi-value density data (multi-value pattern) stored in the register 202 by the CPU 201 to a multiplexer (MPX; to be described later) 209 only when the multi-value pattern output enable signal PATCH output from the image control signal generation circuit 203 is enabled.

The multiplexer 209 switches data to be supplied to a γ table 210 between an external video signal /VDO and the output signal (multi-value pattern) from the multi-value pattern generation circuit 208 in response to a select signal SEL supplied from the register 202. The γ table 210 performs γ conversion on the input multi-value image data for matching the characteristics of the printer engine. Reference numeral 211 denotes a PWM (pulse-width modulation) circuit for generating a laser control signal on the basis of multi-value data supplied from the γ table 210.

Reference numeral 207 denotes a laser control circuit 2, which generates a laser drive signal on the basis of the /LON signal when the print enable signal /VDOE is output from the above-mentioned laser control circuit 1, and of a signal output from the PWM circuit 211, and supplies the generated signal to a laser driver (not shown).

The test pattern generation method and the categorization of the cause of a failure in the image forming apparatus of this embodiment is described in detail below.

Figure 2:
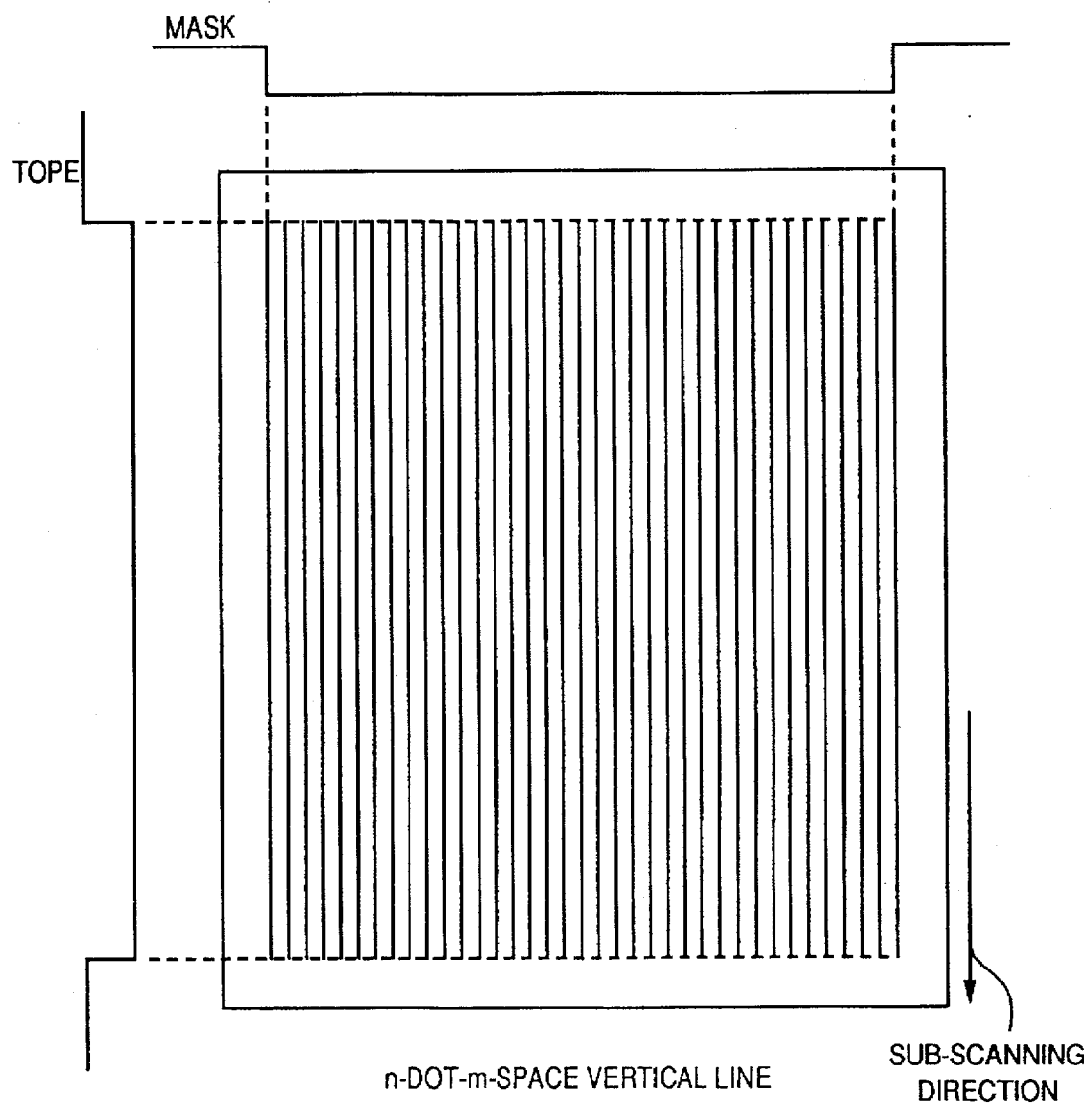
FIG. 2 is a view showing an example of a test pattern output by the test pattern generation circuit 204 of FIG. 1 according to the first embodiment.
Figure 3:
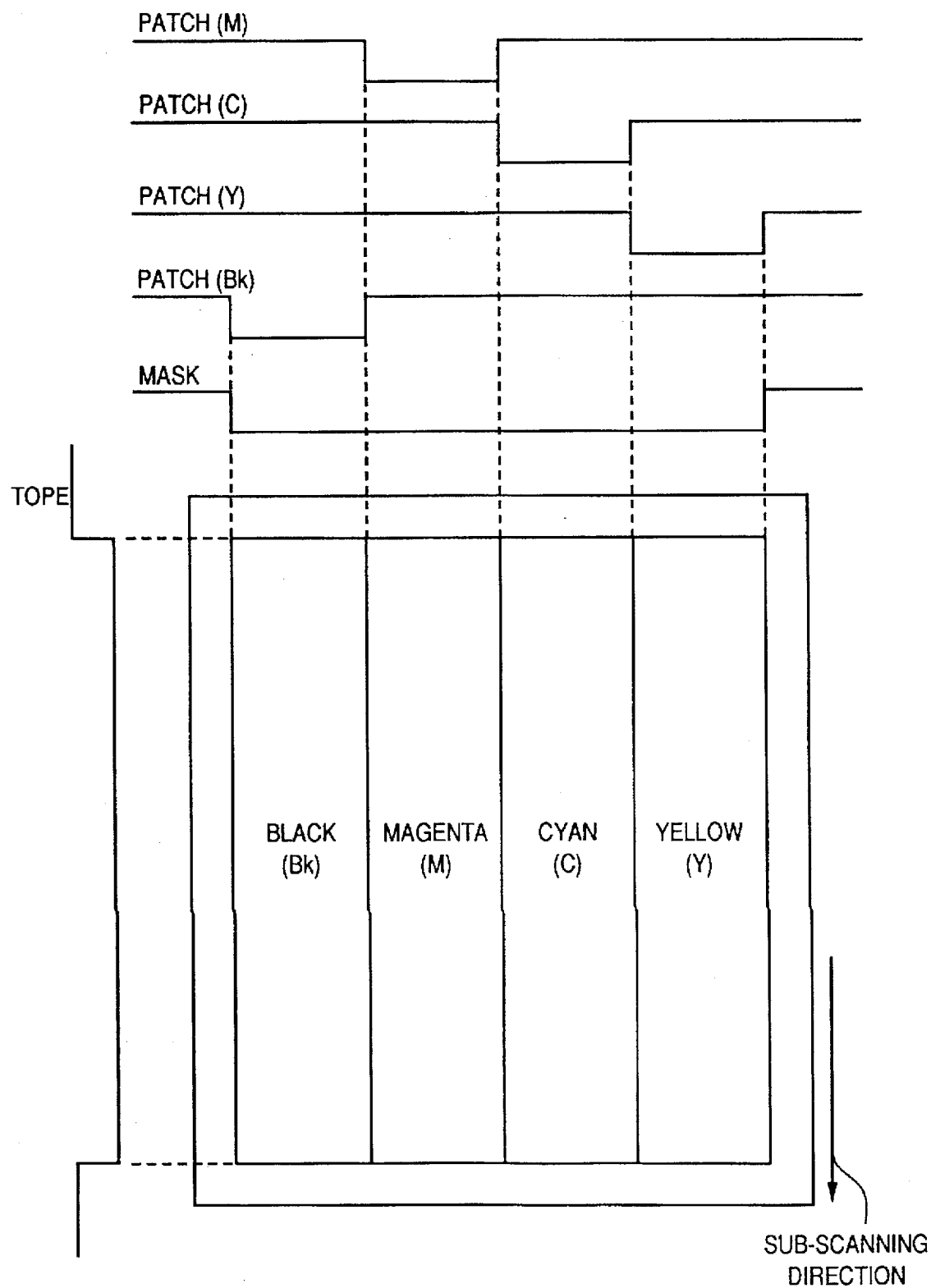
FIG. 3 is a view showing an example of a multi-value test pattern output by the multi-value test pattern generation circuit 208 of FIG. 1 according to the first embodiment.

FIG. 2 shows an example of a test pattern output by the test pattern generation circuit 204 (see FIG. 1) of this embodiment, and FIG. 3 shows an example of a multi-value test pattern output by the multi-value test pattern generation circuit 208 of this embodiment.

The setting sequence of the image control signal for outputting the above-mentioned test patterns in this embodiment are described below with reference to the flow chart in FIG. 4.

Figure 4:
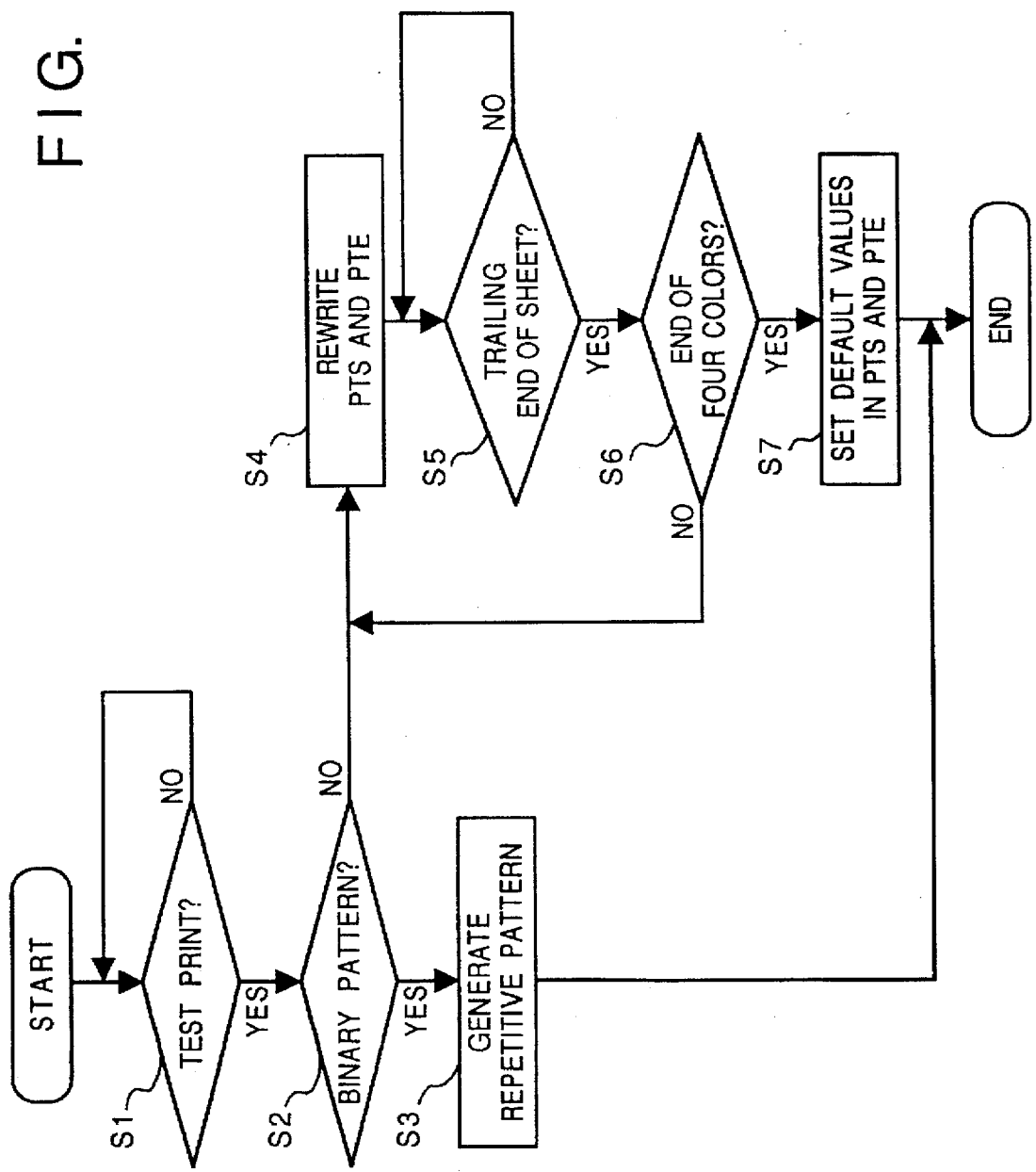
FIG. 4 is a flow chart showing the setting sequence of an image control signal used for outputting a test pattern in the first embodiment.

In step S1 in FIG. 4, the test print mode is confirmed. If it is confirmed that the test print mode is started, whether the test pattern generation circuit 204 in the image controller 206 of the image forming apparatus of this embodiment outputs a binary test pattern, or the multi-value pattern generation circuit 208 generates a multi-value test pattern is determined on the basis of the signal SEL from the register 202 in step S2.

Figure 5:
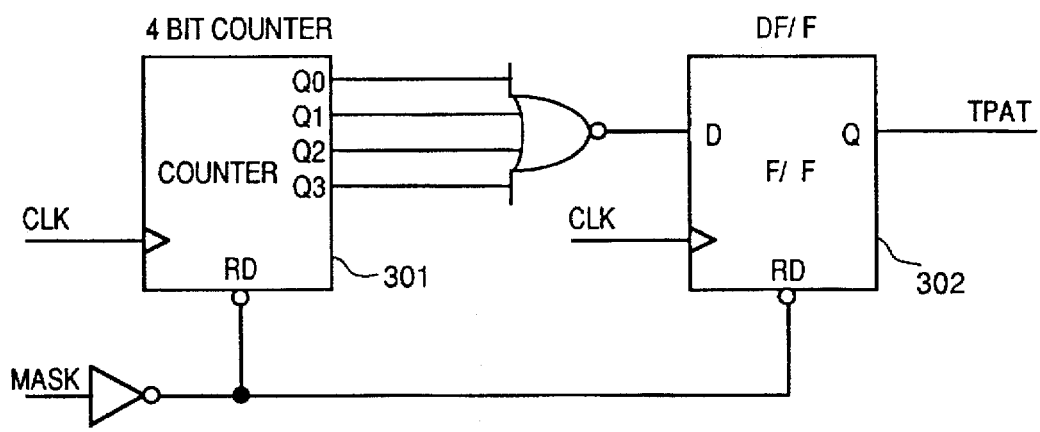
FIG. 5 is a block diagram showing the internal arrangement of the test pattern generation circuit 204 of FIG. 1.

FIG. 5 is a block diagram showing the internal arrangement of the test pattern generation circuit 204. If generation of the binary pattern is selected in the step S2, a 4-bit counter 301 in the test pattern generation circuit 204, which operates in synchronism with the main scanning control signal MASK, generates a repetitive pattern in a print enable region in step S3, thus obtaining the test pattern shown in FIG. 2.

In the test pattern shown in FIG. 2, the intervals of the lines and spaces are n dots and m spaces (n and m are integers), and they are freely set. In this case, the sum of n and m is preferably an x-th power of 2 to realize a simple arrangement.

On the other hand, if the multi-value pattern is selected in step S2, the CPU 201 rewrites the contents of PTS and PTE registers, which are internal registers of the register 202 and are used for generating the signal PATCH, so that the signal PATCH becomes a signal PATCH(M) shown in FIG. 3 before the print enable region in the sub-scanning direction becomes a "TRUE" state, in step S4. The print operation is continuously performed on the region of the signal PATCH (M) until the print enable region in the sub-scanning direction becomes a "FALSE" state.

This arrangement enables a sequence of forming a magenta color to output the PATCH signal represented by the signal PATCH(M) which is outputted in every main scanning.

Thereafter, if image processing corresponding to the trailing end of a recording sheet is accomplished in step S5, the CPU 201 rewrites the contents of the PTS and PTE registers, so that the signal PATCH becomes a signal PATCH (C) shown in FIG. 3 before the print enable region in the sub-scanning direction becomes a "TRUE" state.

The same processing is performed for Y and Bk, and upon completion of Bk print processing, the contents of the PTS and PTE registers are rewritten to default values. In this case, the print order is M, C, Y, and Bk, and the order of color bands is Bk, M, C, and Y from the left side in FIG. 3. However, the present invention is not limited to these orders, and the orders may be changed independent of the operation of this embodiment.

Figure 6:
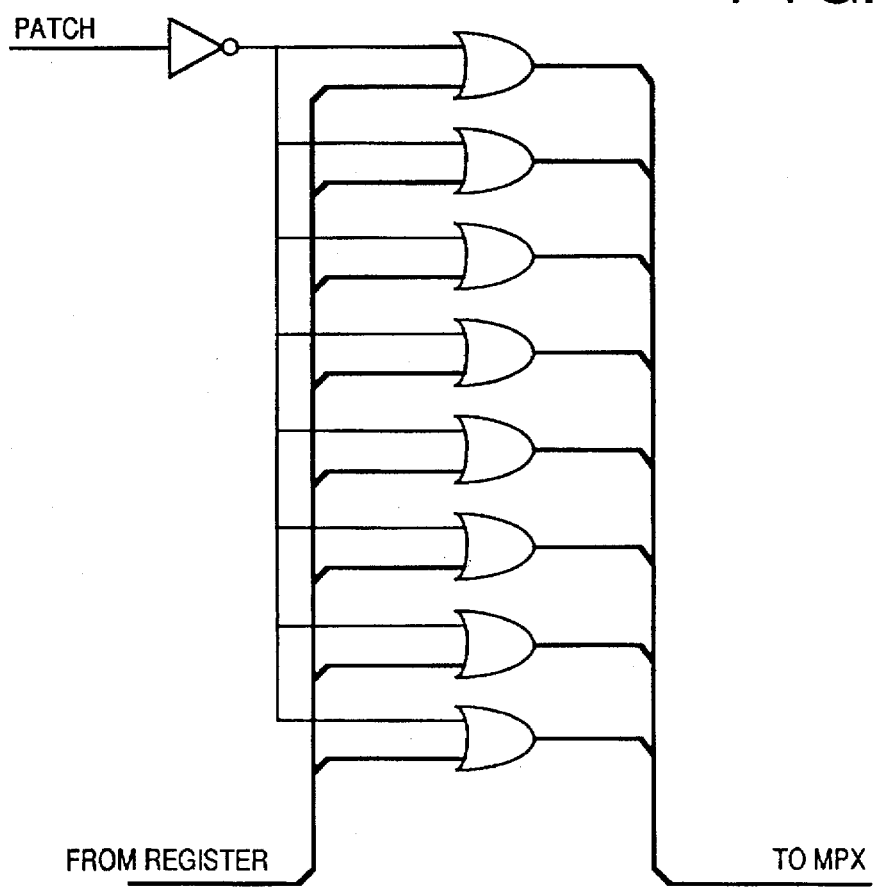
FIG. 6 is a block diagram showing the internal arrangement of the multi-value test pattern generation circuit 208 of FIG. 1.
Figure 7:
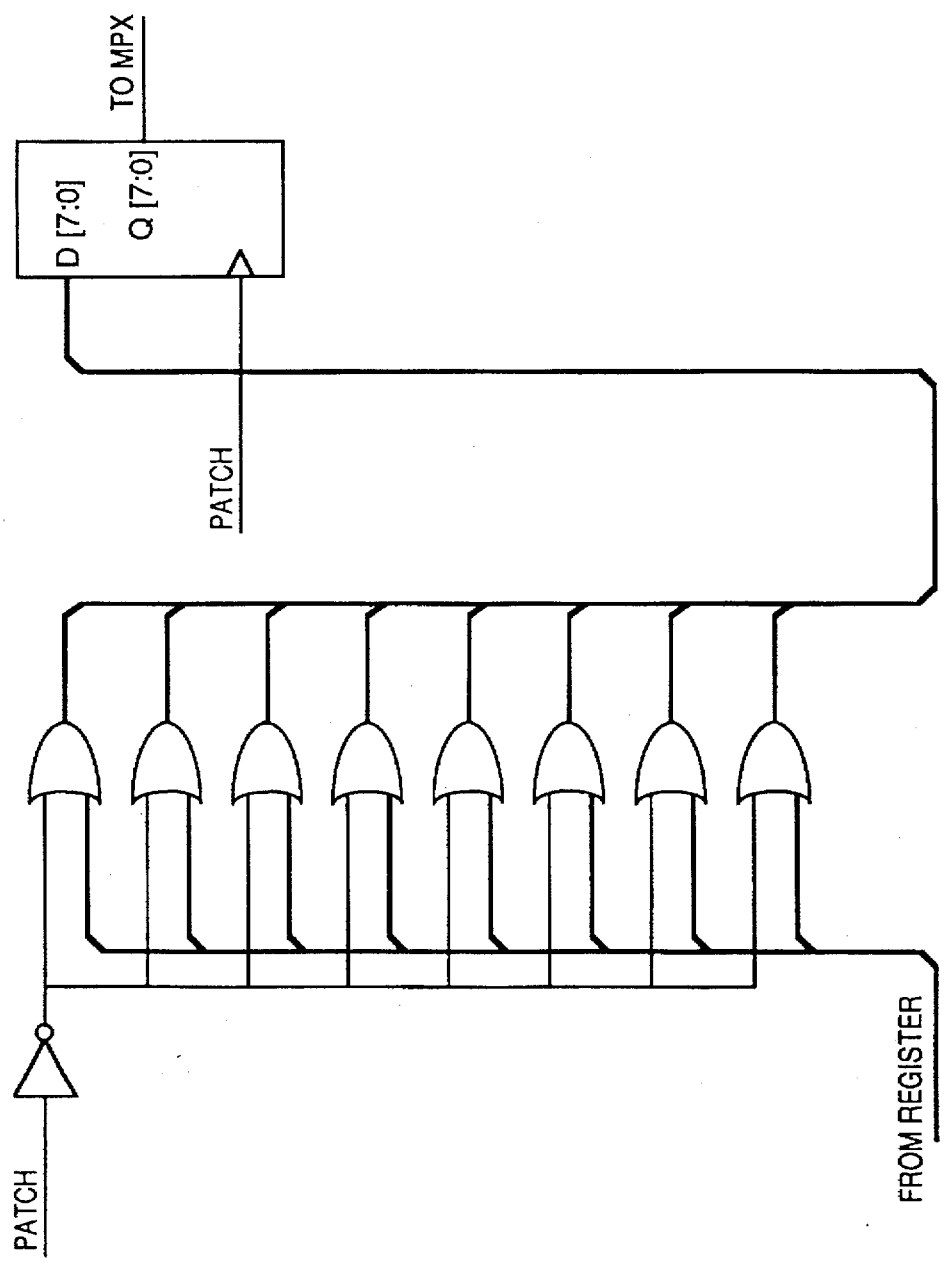
FIG. 7 is a block diagram showing the internal arrangement of the multi-value test pattern generation circuit 208 of FIG. 1.

FIGS. 6 and 7 are block diagrams showing examples of the internal arrangement of the multi-value pattern generation circuit 208 according to this embodiment.

When the multi-value pattern generation circuit 208 has the arrangement shown in FIG. 6, a test pattern whose density is left unchanged in the sub-scanning direction, as shown in FIG. 3, is output. On the other hand, when the multi-value pattern generation circuit 208 has the arrangement shown in FIG. 7, the density may be changed in units of lines.

FIG. 8 is a view showing the categorization of a failed portion based on the test pattern in this embodiment. In this embodiment, as described above, the test pattern generation circuits output binary and multi-value test patterns, and the cause of the failure is categorized by checking if these test patterns are normally output. More specifically, in the multi-value image forming apparatus of this embodiment, as shown in FIG. 8, the cause of a print abnormality is normally categorized between an engine failure and a controller failure on the basis of a print abnormality state which occurs in a print operation. Furthermore, when a failure is categorized as an engine failure, as shown in items b) to d) in FIG. 8, the failure is further categorized between the image control signal unit (binary unit) side and the image output unit (multi-value unit) side.

As described above, the two independent test pattern generation circuits generate binary and multi-value engine test patterns, and the cause of an abnormal state of the image forming apparatus is categorized between an engine failure and a controller failure on the basis of the print states of these patterns.

Second Embodiment

The second embodiment of the present invention is described below. Since an image forming apparatus according to this embodiment is the same as the image forming apparatus according to the first embodiment shown in FIG. 1, an illustration and description thereof is omitted.

The test pattern generation method and the categorization of the cause of a failure in the second embodiment of the present invention is explained below.

Figure 9:
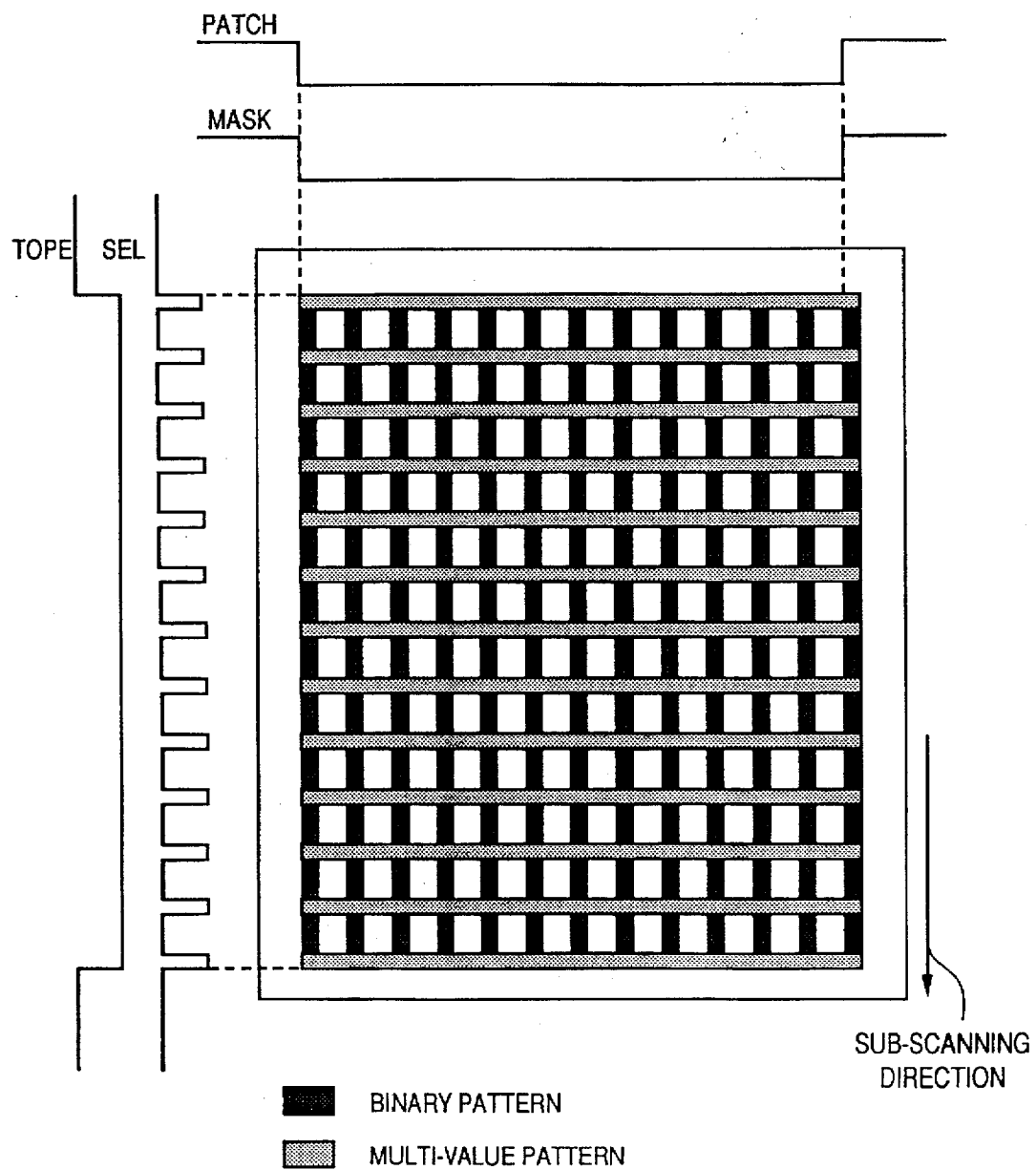
FIG. 9 is a view showing a test pattern according to the second embodiment of the present invention.

FIG. 9 shows a test pattern according to the second embodiment. The test pattern shown in FIG. 9 is an example of a test pattern output as a result of synthesis of the pattern output by the test pattern generation circuit 204 and the multi-value pattern output by the multi-value pattern generation circuit 208 by the laser control circuit 2 (207).

Figure 10:
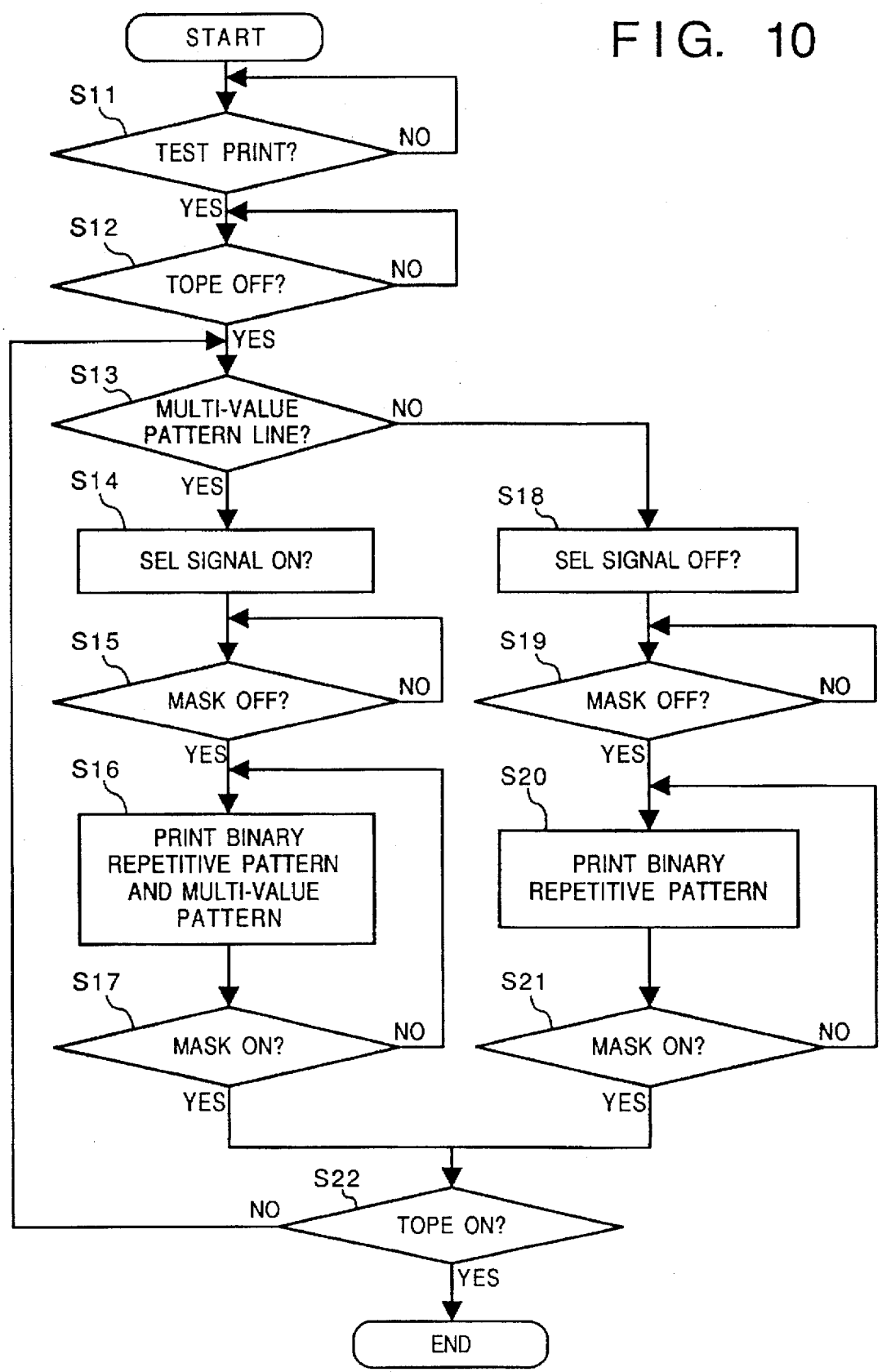
FIG. 10 is a flow chart showing the setting sequence of an image control signal used for outputting a test pattern in the second embodiment.

FIG. 10 is a flow chart showing the setting sequence of an image control signal for outputting a test pattern in this embodiment. Referring to FIG. 10, if it is confirmed in step S11 that the test print mode is started, it is checked in step S12 if the sub-scanning mask signal TOPE is "OFF". If a sub-scanning print enable region is reached, it is checked in step S13 if the region corresponds to a line for generating a multi-value pattern.

If it is determined in step S13 that the line of interest is a line for generating a multi-value pattern, a signal SEL for generating a multi-value pattern is set "ON" (step S14). When the main scanning mask signal MASK becomes "OFF" (YES in step S15), a binary repetitive pattern and a multi-value pattern are generated (steps S16 and S17).

On the other hand, if it is determined in step S13 that the line of interest is not a line for generating a multi-value pattern, the signal SEn for generating a multi-value pattern is set "OFF" in step S18. When the main scanning mask signal MASK becomes "OFF" (YES in step S19), a binary repetitive pattern is generated (steps S20 and S21).

As a result of the above-mentioned processing, upon completion of processing of each line, it is checked in step S22 if the sub-scanning mask signal TOPE is "ON". If the signal TOPE is "OFF", the flow returns to step S13; otherwise, this processing ends.

As described above, since the binary and multi-value test patterns generated by the two independent pattern generation circuits are output onto a single recording sheet, the cause of a print abnormality is categorized between an engine failure and a controller failure on the basis of a single engine test print result, thus simplifying the categorization of the causes of failures.

The present invention is applicable to either a system constituted by a plurality of devices or an apparatus consisting of a single device. The present invention is also applicable to a case wherein the invention is achieved by applying a program to the system or apparatus.

As described above, according to the present invention, since a multi-value specific pattern is subjected to the same image forming processing as that for externally input multi-value image data, when a print abnormality occurs, its cause is easily categorized between the engine side and the controller side.

According to another aspect of the invention, the cause of a print abnormality is categorized only when the image forming apparatus is in the test print mode.

According to still another aspect of the invention, the cause of an engine failure is categorized between the binary image processor side and the multi-value image processor side.

As many widely different embodiments of the present invention can be made without departing from the spirit and scope thereof, it is to be understood that the invention is not limited to the specific embodiments thereof except as defined in the appended claims. Thus, combinations of specific embodiments can be made without departing from the spirit and scope thereof.

What is claimed is:

1. An image forming apparatus comprising:

input means for externally inputting multi-value image data;

conversion means for performing a predetermined conversion on multi-value image data;

first pattern generation means for generating multi-value image data representing a multi-value test pattern;

selection means for selectively providing the multi-value image data input by said input means or the multi-value image data generated by said first pattern generation means to said conversion means;

second pattern generation means for generating binary image data representing a binary test pattern;

output means for outputting a visual image based on image data converted by said conversion means and/or based on said binary image data, wherein the binary image data representing the binary test pattern is directly supplied to said output means without conversion by said conversion means.

2. The apparatus according to claim 1, further comprising:

means for discriminating whether or not an operation mode of said image forming apparatus is a test print mode, and wherein when the operation mode is the test print mode, said selection means provides the multi-value image data generated by said first pattern generation means to said conversion means.

3. The apparatus according to claim 1, wherein said output means visually outputs the multi-value test pattern and the binary test pattern on independent recording sheets.

4. The apparatus according to claim 1, wherein said output means visually outputs the multi-value test pattern and the binary test pattern on a single recording sheet.

5. The apparatus according to claim 1, said conversion means further comprising pulse-width modulation means for outputting image data which is pulse-width modulated based on multi-value image data.

6. The apparatus according to claim 1, said conversion means further comprising means for changing tone characteristics of the input multi-value image data and for outputting the changed image data.

7. The apparatus according to claim 1, said output means further comprising color image output means for frame-sequentially outputting an image of each color component.

8. The apparatus according to claim 1, said output means further comprising:

means for scanning a light beam which is modulated based upon image data;

detection means for detecting the scanned light beam at a prescribed scanning position; and means for generating a light-beam turn-on signal so that said detection means detects the scanned light beam, wherein said binary image data is superimposed on said light-beam turn-on signal.

9. The apparatus according to claim 1, further comprising means for synthesizing the multi-value image data from said conversion means and the binary image data.

* * * * *

UNITED STATES PATENT AND TRADEMARK OFFICE
CERTIFICATE OF CORRECTION

PATENT NO. : 5,720,011
DATED : February 17, 1998
INVENTOR : TOMOHIRO HASHIMOTO

It is certified that error appears in the above-identified patent and that said Letters Patent is hereby corrected as shown below:

COLUMN 3 line 50,   "sequence" should read --sequence of the--; and
   line 51,   "of the" (second occurrence) should be deleted.

COLUMN 4 line 2,   "202:" should read --202.--.

COLUMN 6 line 44,   "$SE_n$" should read --SEL--;
   line 64,   "applying" should read --supplying--.

Signed and Sealed this

Thirteenth Day of October 1998

BRUCE LEHMAN

*Attest:*

*Attesting Officer*   *Commissioner of Patents and Trademarks*